Sept. 21, 1965 A. C. WALKER ETAL 3,208,013

ELECTROMAGNETIC WAVE ABSORBER COMPRISING INHERENTLY RESONANT FILAMENTARY FIBERS SUSPENDED IN DIELECTRIC

Filed July 31, 1961

AUGUSTUS C. WALKER
IRVING LITANT
*INVENTORS*

*BY* Alden D Redfield
Abraham Ogman
ATTORNEYS

United States Patent Office 3,208,013

Patented Sept. 21, 1965

3,208,013

ELECTROMAGNETIC WAVE ABSORBER COMPRISING INHERENTLY RESONANT FILAMENTARY FIBERS SUSPENDED IN DIELECTRIC

Augustus C. Walker, Wilmington, and Irving Litant, Lexington, Mass., assignors to Avco Corporation, Cincinnati, Ohio, a corporation of Delaware Filed July 31, 1961, Ser. No. 128,207
5 Claims. (Cl. 333—22)

Figure 1:
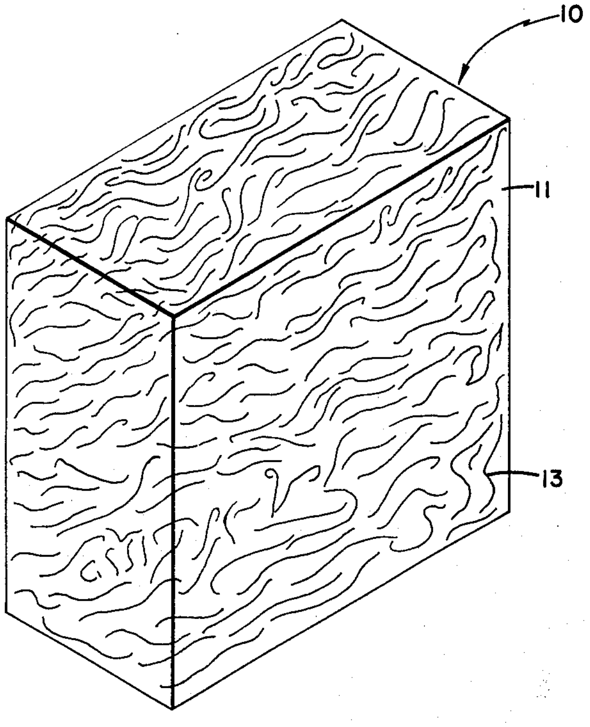

This invention generally relates to an absorbing means and more particularly, to a material useful in electrical and electronic applications as an absorber of electromagnetic waves.

There are numerous materials available in the commercial market which absorb electromagnetic waves. These materials typically are manufactured by loading a normally nonconducting material (an electrical insulating material) with an electrical conducting material, such as metal, graphite, or other carbon material. In absorbers of the prior art type, the nonconducting material is usually loaded extremely heavily with the electrical conducting material; 40 to 60% loadings are very common; however, even these are not considered to be satisfactory. Where the nonconducting material is heavily loaded, the absorber does not exhibit the physical properties of the nonconducting materials. Very often, the denisty is increased materially. An increase in brittleness and general physical weakness also develops.

Practitioners in the art of absorbing electromagnetic waves have long sought to improve absorbers of electromagnetic waves.

It is an object of the invention to provide an electromagnetic wave absorbing means which avoids the limitations and advantages of such prior art means.

It is still another object of the invention to provide an electromagnetic wave absorbing means which comprises a nonconducting material that has been very lightly loaded with filamentary electrical conducting material, the result being an improved and efficient absorber.

It is still another object of the invention to provide an electromagnetic wave absorbing means that is characterized by a nonconducting material loaded with a conducting material, the combination having substantially the same physical properties as the nonconducting material.

It is still another object of the invention to provide an electromagnetic wave absorbing means which operates efficiently to absorb energy over a broad band of electromagnetic wave frequencies.

It is yet another object of the invention to provide an electromagnetic wave absorbing means in which the absorbing elements comprise frequency responsive elements.

In its broadest aspect, the invention contemplates an electromagnetic absorbing means comprising a nonconducting material in which are incorporated filamentary electrical conducting material, such as graphite, aluminum, copper, etc. The filamentary electrical conducting materials comprise frequency responsive circuits which are compatible with the frequency or frequencies of the electromagnetic waves that are to be absorbed.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

FIGURE 1 is a perspective representation of an electromagnetic wave absorbing means embodying the principles of the present invention.

The electromagnetic wave absorbing means designated in FIGURE 1 is generally designated 10. It comprises a matrix material 11, which defines the physical and mechanical properties of the absorber 10. The matrix material is typically an insulator or electrical nonconductor, preferably a foam plastic composition such as polyurethane or a solid plastic such as an epoxy resin.

There are incorporated throughout the matrix material 11, electrical conducting means comprising fibers 13 of an electrical conducting material such as graphite or metal. The fiber lengths may be uniform or of varying lengths. As will be seen, the length of the fibers are related to the frequency or the frequencies of the electromagnetic waves that are to be absorbed.

An electromagnetic wave is composed of transverse electric and magnetic fields. In free space, both the electric field and magnetic fields are transverse to the direction of propagation of the electromagnetic wave.

The fibers 13 are dispersed in a random fashion in FIGURE 1 for omnidirectional absorption. It is emphasized that the random arrangement is presented as an illustration and not as a limitation. The fibers may be oriented in any preferred manner. For example, where it is desired to absorb energy coming from a known direction, the fibers, for most efficient absorption, may be oriented transverse to the direction of the incoming electromagnetic waves and parallel to the electric field.

As is apparent in FIGURE 1, the fibers 13 are dispersed in a spaced relationship and as such, are electrically independent as well as mechanically separated.

Before presenting examples of absorbing materials embodying the principles of the present invention, it is advisable to present briefly the significant electrical parameters used in evaluating an absorber of electromagnetic waves. The principle parameters are the complex dielectric constant $\epsilon$ and the components thereof $\epsilon'$ and $\epsilon''$. $\epsilon'$ and $\epsilon''$ are respectively the real and imaginary parts of the complex dielectric constant $\epsilon$. Another important parameter is the loss tangent, generally designated tan $\delta$. Tan $\delta$ comprises the ratio of $\epsilon'/\epsilon''$.

$\epsilon''$ is a measure of the ability of the electromagnetic wave absorbing materials to dissipate electromagnetic wave energy by absorption. The absorption ability is related directly to the value of $\epsilon''$. The ability of a material to reflect electromagnetic waves is related directly to the value of $\epsilon'$.

Generally, the parameters $\epsilon'$ and tan $\delta$ are used in making comparisons of materials. Densities are an important consideration with foam materials. A comparison chart of electromagnetic wave absorbing materials follows:

FOAM ABSORBING MATERIAL

| | Percent of fibers by weight | Density, lbs./ft.² | $\epsilon'$ | tan $\delta$ |
|---|---|---|---|---|
| A | 3.00 | 2.41 | 2.2 | 0.20 |
| B | 3.3 | 2.75 | 4.04 | 0.82 |
| SOLID ABSORBING MATERIAL | | | | |
| C | 0.01 | ---------- | 2.94 | 0.107 |
| D | 0.05 | ---------- | 3.79 | 0.340 |
| E | 0.10 | ---------- | 4.32 | 0.33 |
| COMMERCIAL PRODUCT—FOAM | | | | |
| F | Particles | [1] 7 | 4.24 | 0.67 |

[1] Approx.

The measurements to determine $\epsilon$ and tan $\delta$ were made at 10,000 megacycles.

The matrix material of A and B was a urethane foam. The fibers incorporated in the urethane foam were formed from graphite having a resistivity of $1000\times10^{-6}$ ohm.

centimeters. The average length of the graphite fibers was 3 millimeters, and they had an average diameters of 10 microns. The fibers were dispersed within the urethane foam by means of a suitable mixer, such as a blender, prior to expanding the urethane material into a foam.

The matrix materials of C, D and E comprised an epoxy resin. The graphite fibers used were similar to those described above and were dispersed in the plastic material prior to curing.

Material F is known to be a material which uses carbon particles. The percentage of carbon particles is not known. It will be noted, however, that the density of material F in relation to the foam material embodying graphite fibers is three times heavier. Since the density ratio of carbon to most foams is in the order of 50 to 100, it is reasonable to presume that the relatively high density of the commercial material F results from an extremely heavy loading of carbon particles. This presumption is further substantiated by the fact that the commercial material F is a conductor of electricity—it exhibits electrical continuity—whereas there is no electrical continuity in materials A through E which utilize fibers.

Nonconducting materials containing filament electrical conductors and fibers are more efficient absorbers than are materials containing particles or flakes of electrical conductors. It is theorized that the fibers act as antenna elements. As such, an impinging electromagnetic wave induces in the "antenna element" oscillating currents. Since the fibers are passive impedance elements which include a resistive component, and $I^2R$ loss occurs. Manifestly, the energy dissipated in the resistance is derived from the impinging electromagnetic wave.

It is well known in the art that an electrical conductor having a length equal to one half the wave length of a frequency, or an integral multiple of a one half wave length, acts as an extremly efficient antenna. These types of elements represent tuned circuits. It is also well known that there is developed within a tuned circuit an oscillating current which is a large, totally internal, circulating current. This circulating current generates the $I^2R$ loss mentioned above.

Absorbers using particles or flakes are much less efficient.. There is no relationship between the dimensions of the particles and the flakes and the frequencies of the electromagnetic waves that are to be absorbed. Although electromagnetic waves impinging against a particle or flake, in which current can flow, will induce, therein, a current, the current will be substantially smaller than that induced in a filament, everything else being equal. It follows, since the power dissipated within an absorbing element is a function of the square of the current, the power absorbed by a particle or a flake is very much lower than the power absorbed in a fiber.

A further advantage derived from the use of fibers concerns the construction of a broad band electromagnetic wave absorber; i.e., an absorber that is capable of efficiently absorbing electromagnetic waves having frequencies covering a broad band of frequencies. A broad band absorber may be constructed by incorporating in the nonconducting material fibers having a nonuniform length, corresponding to the wave lengths of the electromagnetic waves that are to be absorbed. The longest fibers will correspond to a one half wave length of the lowest frequency electromagnetic wave on the band to be absorbed; the length of the shortest fiber will correspond to a one half wave length of the highest frequency in the band It is apparent from the foregoing illustrations that a considerable contribution has been made in the art of forming absorbers for electromagnetic waves. Not only is it possible to provide more efficient abosrbers, but the absorbing function is accomplished with a small amount of conducting materials compared with the prior art materials and their loadings. Typically, the physical properties of the electromagnetic wave absorbers are substantially the same as the physical properties of the nonconducting material.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

We claim:

1. An electromagnetic wave absorber comprising: an electrically nonconducting material; and inherently resonant filamentary electrical conducting carbonaceous fiber means dispersed in a spaced relationship throughout said nonconducting material.

2. An electromagnetic wave absorber as described in claim 1 in which said filamentary electrical conducting means are arranged in a random configuration.

3. An electromagnetic wave absorber as described in claim 1 in which said filamentary electrical conducting means vary in length.

4. Means for absorbing electromagnetic waves comprising: an electrically nonconducting material; and filamentary carbonaceous electrical conducting means, responsive to the frequencies of the electromagnetic waves, dispersed in a spaced relationship in said nonconducting material in proportions such as $\epsilon'$ is about 5 and tan $\delta$ is about 1.0.

5. Means for absorbing electromagnetic waves as described in claim 4 in which said filamentary electrical conducting means comprises carbonaceous filaments in the proportion of about 1% by weight.

References Cited by the Examiner

UNITED STATES PATENTS

| | | | |
|---|---|---|---|
| 2,293,839 | 8/42 | Linder | 333—22 |
| 2,682,641 | 6/54 | Sensiper | 333—22 |
| 2,701,861 | 2/55 | Andrews | 333—22 |
| 2,977,591 | 3/61 | Tanner | 333—22 |
| 3,011,981 | 12/61 | Soltes | 23—209.2 |
| 3,036,280 | 5/62 | Woodcock | 333—22 |

OTHER REFERENCES

Article, Chemical Engineering, vol. 66, No. 9, May 4, 1959, page 70.

HERMAN KARL SAALBACH, *Primary Examiner.*